Figure 1:
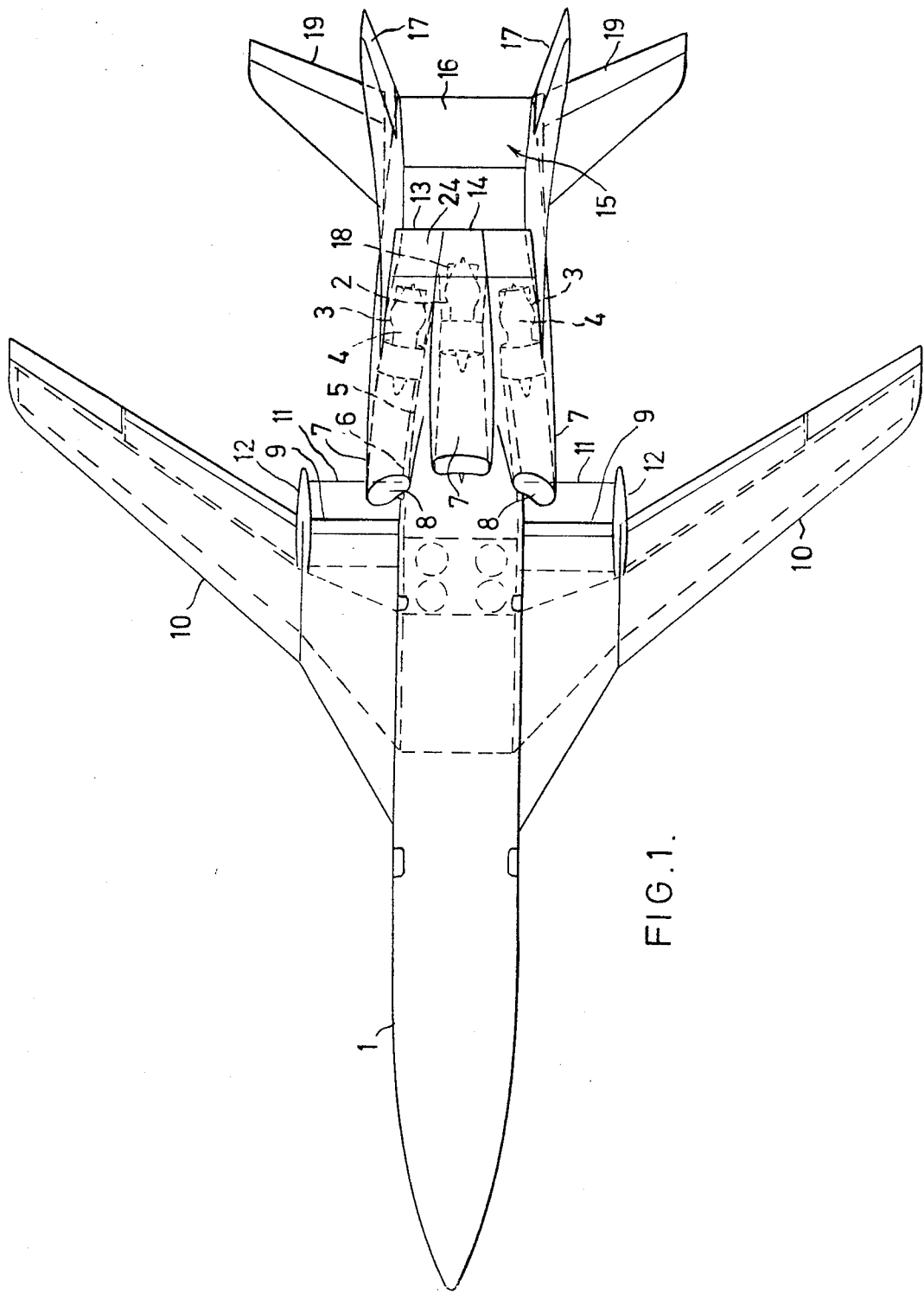

United States Patent [19]
Blythe et al.

[11] 3,936,017
[45] Feb. 3, 1976

[54] COMBINED NOISE SHIELD AND THRUST REVERSER

[75] Inventors: Alan Avery Blythe, St. Albans, England; Robert Ian Milligan, Belfast, Northern Ireland

[73] Assignee: Hawker Siddeley Aviation Limited, England

[22] Filed: July 29, 1974

[21] Appl. No.: 492,741

[30] Foreign Application Priority Data
July 30, 1973 United Kingdom............... 36270/73

[52] U.S. Cl. ... 244/110 B; 181/33 HC; 239/265.37; 244/12 D; 244/55
[51] Int. Cl.² .......................................... B64D 33/06
[58] Field of Search ........ 244/53 R, 53 B, 55, 12 D, 244/23 D, 110 B, 52, 50; 239/265.37; 181/33 HB, 33 HC

[56] References Cited
UNITED STATES PATENTS

| | | | |
|---|---|---|---|
| 3,075,728 | 1/1963 | Kogan | 244/55 X |
| 3,237,891 | 3/1966 | Wotton | 244/55 |
| 3,576,300 | 4/1971 | Palfreyman | 244/55 |
| 3,614,037 | 10/1971 | Vdolek | 244/110 B |
| 3,844,482 | 10/1974 | Stearns | 239/265.37 |

FOREIGN PATENTS OR APPLICATIONS

| | | | |
|---|---|---|---|
| 1,939,338 | 2/1970 | Germany | 244/55 |
| 1,403,761 | 5/1965 | France | 244/12 D |

*Primary Examiner*—Trygve M. Blix
*Assistant Examiner*—Barry L. Kelmachter
*Attorney, Agent, or Firm*—Rose & Edell

[57] ABSTRACT

In an aircraft with a multi-engine configuration at the aft end of the fuselage the engines lie on top and on either side with their air intakes so positioned that downward and sideways noise shielding is provided by the fuselage and the wings, the wings having rearwardly extendible flaps to substantially close at take off and landing, gaps in the noise shield that would otherwise exist between the intakes and the unextended wing trailing edges. The engines exhaust into a noise shielding duct the bottom and side walls of which are provided respectively by a fixed-incidence portion of the tail plane and a pair of fins and rudders upstanding from the tailplane. Upward and downward thrust reversal passages are obtained by rocking back an aft end portion of each engine housing and simultaneously tilting a hingedly mounted forward section of said fixed incidence tail plane portion.

6 Claims, 6 Drawing Figures

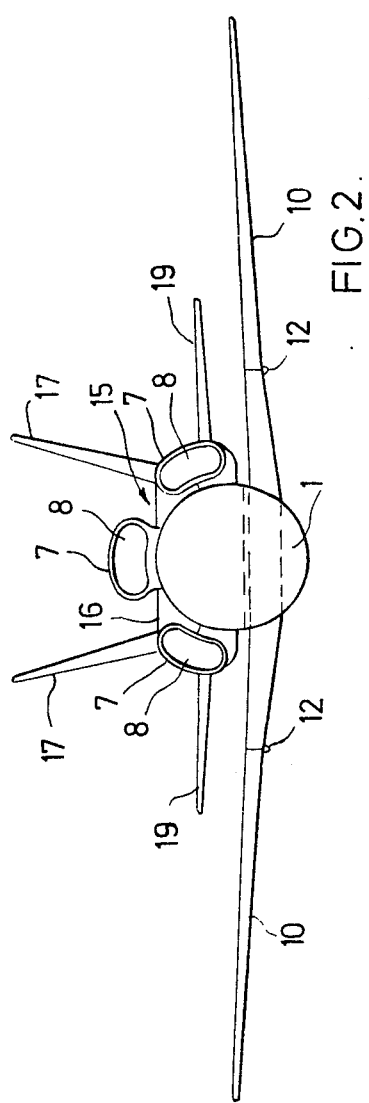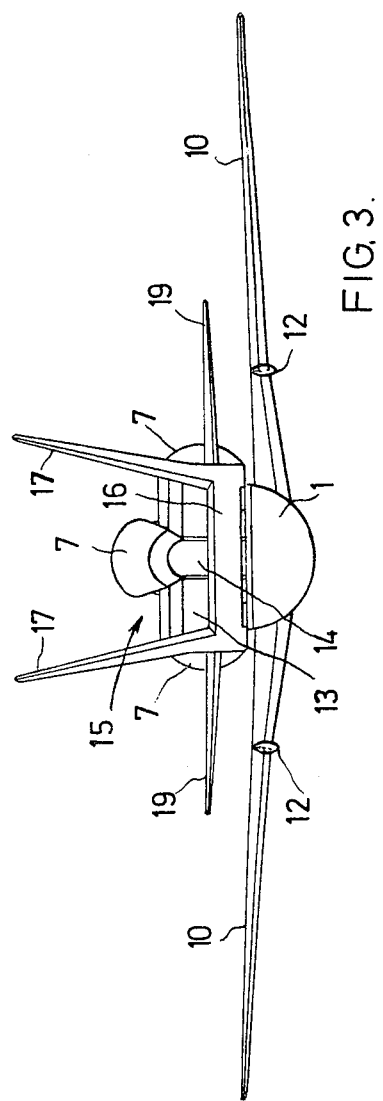

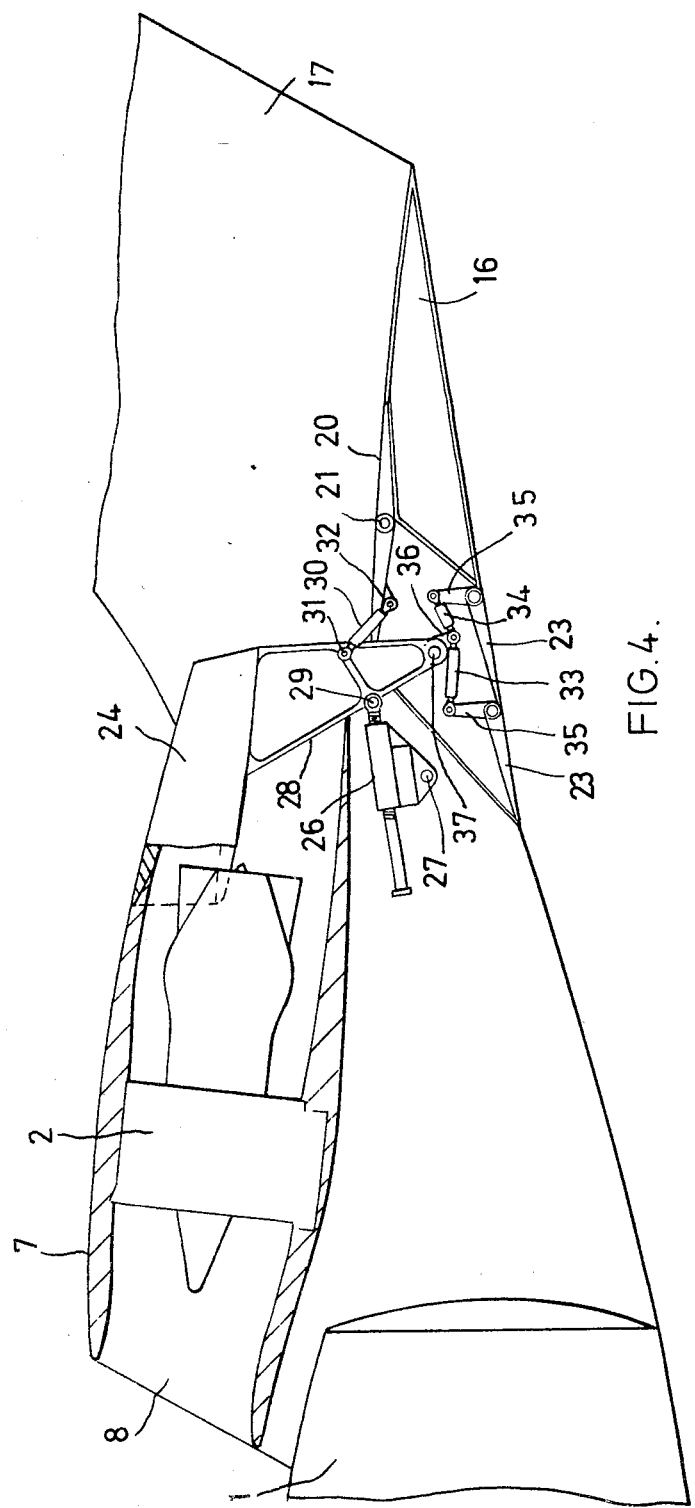

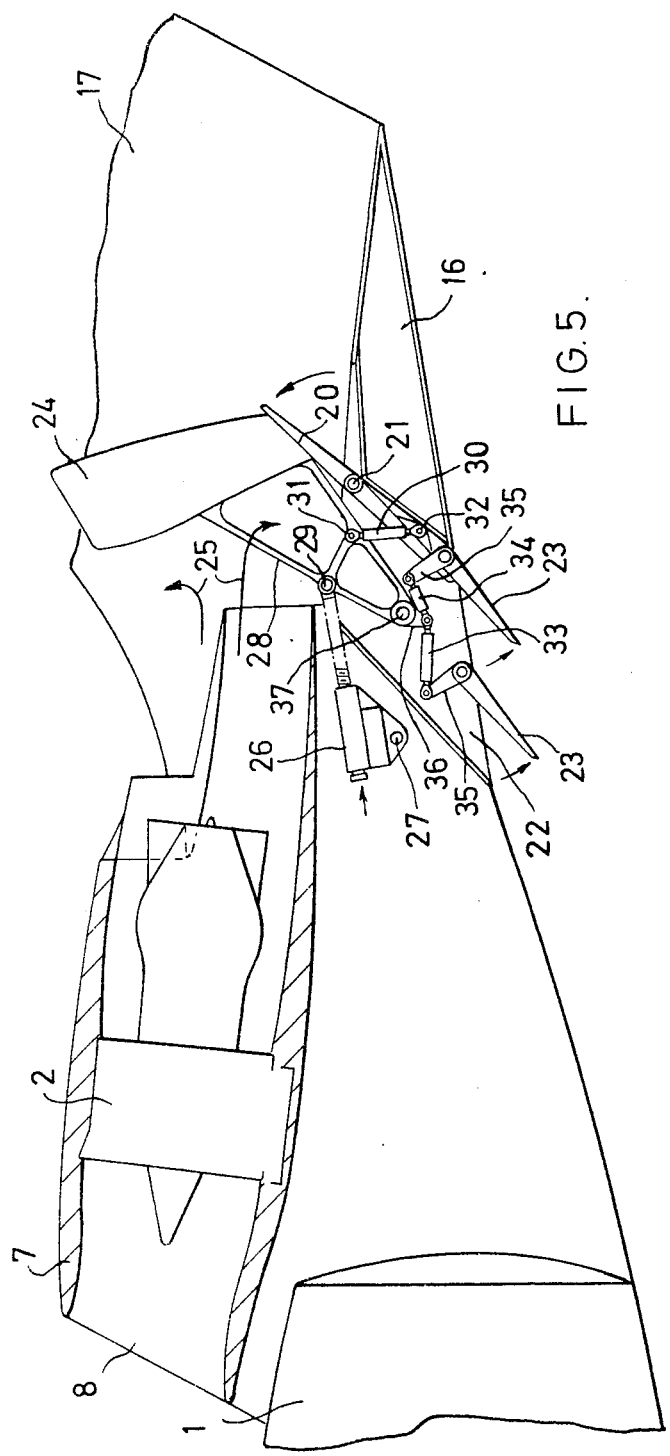

COMBINED NOISE SHIELD AND THRUST REVERSER

This invention concerns improved noise suppression means for aircraft.

Low community noise is a major design consideration for new aircraft development, particularly in the commercial jet transport field. It is known to protect the community from noise emanating from the aircraft engines by suitably positioning them relatively to the airframe such that the airframe will constitute a shield either to absorb a percentage of the noise or deflect a substantial part of it away from the community. It is an object of the present invention to achieve this noise suppression requirement by improved means, in the form of a novel aircraft and engine-installation arrangement.

According to the invention, there is provided an aircraft with a fuselage at or near the rear end of which are located jet propulsion engines mounted on top of said fuselage and/or laterally disposed at opposite sides of its longitudinal axis, each engine air intake being located at a level above the aircraft wing trailing edge and not significantly aft of it such that the fuselage and wing surfaces provide a downward and partial sideways shield against noise emanating from the intakes.

Each engine is, for preference, partially recessed within the fuselage profile to provide an engine fairing or nacelle of reduced surface area for drag reduction and in addition an air intake and exhaust which may be of flattened form to increase noise shielding effectiveness. Also in the preferred arrangement, intake noise may be further shielded by the provision of flaps rearwardly extendible from the wing trailing edge in the take off and landing modes, permitting a reduction in nacelle length with associated reduction in surface area and in-cruise drag when noise shielding is of little consequence.

Each engine exhaust nozzle discharges into a common noise shielding duct or channel formed by a substantially horizontal structure and a pair of spaced-apart substantially vertical fins and rudders. The horizontal structure constitutes a fixed-incidence portion of the tailplane, while variable incidence portions lying outboard of the vertical fins are isolated by the fins from the effect of the engine exhausts and varying throttle settings.

In a preferred embodiment, an upstream portion of said fixed-incidence horizontal structure is deflectable in conjunction with a portion of the engine nacelle to form a thrust reverser common to all the engines. There is considerable advantage in this arrangement in that the reversed thrust exhausting close to the aircraft longitudinal axis will impart no significant asymmetric loadings to the aircraft in the event of an engine-out condition.

Figure 6:
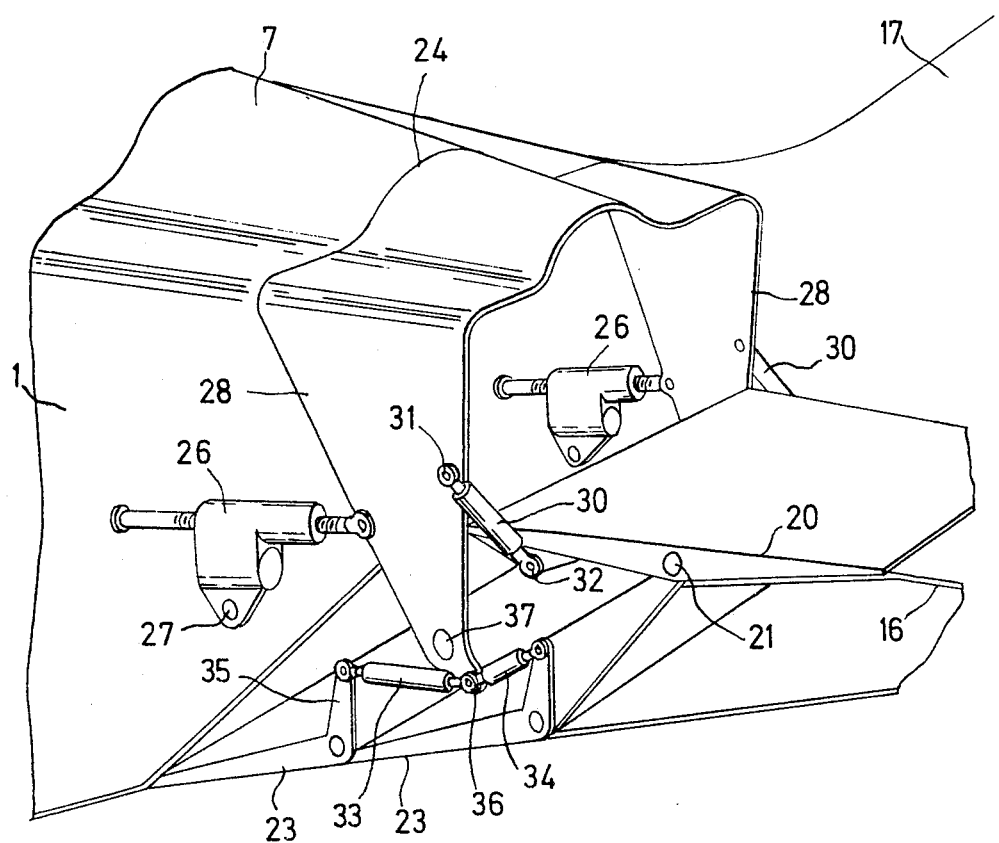

One embodiment of the invention will now be described, by way of example, with reference to the accompanying drawings, in which FIG. 1 is a plan view of an aircraft in accordance with the present invention, FIG. 2 is a front view of the aircraft of FIG. 1, FIG. 3 is a rear view of the aircraft of FIG. 1, FIG. 4 is a longitudinal section through the aircraft rear end looking outboard, FIG. 5 is a similar view to FIG. 4 but with the thrust reverser operative, and FIG. 6 is a pictorial arrangement of the reverse thrust installation.

Referring to the drawings, in the aircraft configuration shown three jet propulsion engines are mounted upon and close to the rear end of a fuselage 1. A central engine 2 is mounted on top of the fuselage, the remaining pair 3 being disposed on either side of the aircraft longitudinal centre line such that their own longitudinal centre lines 4 are rearwardly convergent.

The fuselage rear end profile 5 is such that each engine is, in effect, partially recessed within the basic fuselage profile 6. This permits the engine fairings 7 to be of reduced surface area and the air intakes 8 of flattened form, both of which features promote noise attenuation by increasing the ratio of the shielding length to the depth of the noise source.

Each engine fairing 7 extends forward of its respective engine, the outer two terminating when the air intake is just behind the trailing edge 9 of the wing 10; downward the sideways noise, emanating from the air intakes, is thus shielded by the fuselage and wing. This shielding may be further increased by the provision of flaps 11 rearwardly extendible in the take-off and landing modes from stowed positions within the wing trailing edge 9. This latter feature enables the engine fairing length to be suitably reduced, within the scope permitted by the extendible flaps. The flaps are slidably mounted at their ends on the fuselage sides and on faired cantilever beams 12 on the wing. This is both a weight saving arrangement and a means of reducing in-cruise drag.

The rearward convergence of the engine axes provides that the effluxes, exhausting through nozzle fairings 13 and 14, can discharge into a common noise shielding channel 15 formed by a horizontal structure 16 and a pair of spaced-apart substantially vertical fins 17 to provide both sideways and downwards shielding. A condition of efficient noise shielding is the combination of flattened nozzle depth with a maximum possible shielding length. This is further enhanced by providing each engine 2, 3 with a multi-lobe nozzle 18. It is known that this type of nozzle can reduce engine noise and fuel consumption. In relation to the present arrangement these nozzles provide increased noise shielding effectiveness. Since jetnoise emanates at a line source downstream of the nozzle, whereas other noise emanates from the nozzle itself, the use of multi-lobe nozzles to increase mixing of jet and by-pass air will reduce the jet noise content of the noise spectrum.

The horizontal structure 16, in addition to performing its noise shielding function, acts as a fixed-incidence portion of the tailplane; variable incidence portions 19 extend laterally outboard of the vertical fins 17. They are thus advantageously isolated from the effect of the engine exhausts and throttle variations.

A further advantage of this present arrangement resides in the provision of thrust reversal. It would be possible to apply conventional thrust reversers to the outer engines but with conventional arrangements the application of thrust reversal to a centre engine would normally be difficult to achieve. However, the horizontal structure 16 incorporates at its upstream end a flap 20 having pivotal attachment to the fixed structure at 21 and movable from a closed position as shown in FIGS. 4 and 6 where it forms the forward upper surface of the horizontal structure 16 to an open position as shown in FIG. 5 where it reveals a duct or ducts 22 extending down between the vertical fins 17. The lower duct exit is similarly closed by movable lower flaps 23 when not in use, which flaps open in conjunction with upper flap 20 to lie substantially in alignment with or parallel to the flow direction through the duct 22. To complete the thrust reverser an upper rear portion 24 of the engine fairing rotates up and back to form in combination, with flaps 20 and 23, a multi-directional duct for thrust reversal upward and downward as indicated by the arrows 25 in FIG. 5. The thrust reverser assembly is acted simultaneously by two screw-jacks 26, operated by electrical actuators and which are pivotally mounted at 27 within the forward extensions of, and close to the base of, the fins 17. To allow for a failure condition the electrical actuators may be duplicated with an over-ride device. Alternatively, the thrust reverser system may be motivated by interconnected hydraulic jacks, for example, or pneumatic jacks by air bled from the engines and incorporating integral locks.

The jacks 26 operate directly on quadrants 28 through a pivotal connection 29, the quadrants forming side supports for the upper rear portion 24 of the engine fairing and being pivotally mounting at 37 on the fixed aircraft structure. Adjustable struts 30 provide interconnection between the quadrants 28 and the flap 20, having pivotal attachments 31 and 32 to the quadrant and the flat, respectively, whilst adjustable struts 33 and 34 have pivotal attachment to lever extensions 35 of the lower flaps 23 and provide interconnection to lever extensions 36 of the quadrants 28. Therefore, actuation of the screwjacks simultaneously opens or closes the thrust reverser system as a whole to ensure substantially symmetrical flow upward and downward.

In this arrangement the thrust lines of the engines are biased nose down so that the thrust line passes near the Centre of Gravity. When the thrust reverser is extended the drag line is inclined slightly nose-up. This is sufficient to provide a down load on the main wheels to increase wheel braking efficiency, without offloading the nose wheel to an undesirable extent.

Other features may be provided to improve still further the noise shielding characteristics.

A sheet of low velocity air may be interposed between the engine exhausts and the structure. This air can be ducted from the boundary layer on top of the fuselage ahead of the engine intakes. Thus it acts as a boundary layer bleed energised by the engine exhausts. Such a downstream air sheet has the multiple effect of:
a. reducing scrubbing drag
b. reducing scrubbing noise
c. reducing temperature effects on the aircraft structure
d. reducing structural fatigue The invention is not limited to three-engine designs. Noise shielding can be used either to reduce the overall noise nuisance experienced by the community to levels lower than otherwise possible with the same engines, or to make possible the use of inherently noisier engines, or to avoid the need for special acoustic treatment.

What we claim is:

1. In an aircraft having a fuselage, wings, a tailplane and two laterally spaced fins above the tailplane, the provision of a plurality of jet propulsion engines mounted on said fuselage substantially above the level of said wings and generally aft thereof, an engine housing structure containing said engines, air intakes for said engines located forward of said engine housing structure at a level above said wings and not significantly aft of the trailing edges thereof such that the fuselage and wings provide a downward and partial sideways shield against noise emanating from said air intakes, and exhaust nozzles for said engines located to discharge into a common noise shielding duct defined at the sides by said fins and at the bottom by a fixed-incidence section of said tailplane between said fins, and wherein an upstream portion of said fixed-incidence tailplane section is deflectable in conjunction with a deflectable aft end portion of said engine housing structure to form a thrust reverser common to all engines, said deflectable portion of said fixed-incidence tailplane section being mounted to swing about a first transverse pivot axis intermediate the forward and aft ends of said tailplane section portion so that said forward end goes down and said aft end rises, and the deflectable aft end portion of the engine housing structure being mounted to rock up and back about a second transverse pivot axis until the aft end of said engine housing end portion substantially engages the up-tilted aft end region of the deflectable portion of said fixed-incidence tailplane section.

2. An aircraft according to claim 1, wherein each engine is partially recessed within the fuselage and said air intakes and engine exhausts are of flattened form.

3. An aircraft according to claim 1, wherein flaps are provided that are rearwardly extendible from the wing trailing edges at take off and landing to bridge at least in part a gap that would otherwise exist between the engine intakes and the unextended wing trailing edges.

4. An aircraft according to claim 1, wherein the tailplane has variable incidence portions lying outboard of the fins and thereby shielded by said fins from the engine exhausts.

5. An aircraft according to claim 1, wherein said deflectible portion of said fixed-incidence tailplane section lies at the upper end of a downward passage emerging at the underside of the fuselage, and at least one aft-end-pivoted door is provided for the lower end of said passage which door is swung down when said portion of said fixed-incidence tailplane section and said portion of said engine housing are deflected.

6. An aircraft according to claim 1, having a three-engine configuration with one engine on top of the fuselage and the other two mounted one at each side of the fuselage.

* * * * *